United States Patent
Shreve et al.

(10) Patent No.: US 10,788,464 B2
(45) Date of Patent: *Sep. 29, 2020

(54) SOLVENT PREHEATING SYSTEM FOR LIQUID CHROMATOGRAPHY

(71) Applicant: Waters Technologies Corporation, Milford, MA (US)

(72) Inventors: Joshua A. Shreve, Franklin, MA (US); Greg Kheyfets, Brookline, MA (US); Paul Keenan, Harrisville, RI (US); Paul E. Linderson, Warwick, RI (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 449 days.

This patent is subject to a terminal disclaimer.

(21) Appl. No.: 15/555,630

(22) PCT Filed: Feb. 4, 2016

(86) PCT No.: PCT/US2016/016510
§ 371 (c)(1),
(2) Date: Sep. 5, 2017

(87) PCT Pub. No.: WO2016/144448
PCT Pub. Date: Sep. 15, 2016

(65) Prior Publication Data
US 2018/0045689 A1 Feb. 15, 2018

Related U.S. Application Data

(60) Provisional application No. 62/129,454, filed on Mar. 6, 2015.

(51) Int. Cl.
*G01N 30/02* (2006.01)
*G01N 30/30* (2006.01)
*G01N 30/54* (2006.01)

(52) U.S. Cl.
CPC .............. *G01N 30/02* (2013.01); *G01N 30/30* (2013.01); *G01N 30/54* (2013.01); *G01N 2030/027* (2013.01); *G01N 2030/3053* (2013.01)

(58) Field of Classification Search
CPC ........ G01N 30/02; G01N 30/30; G01N 30/54; G01N 2030/027; G01N 2030/3053
(Continued)

(56) References Cited

U.S. PATENT DOCUMENTS

| 4,088,458 A | 5/1978 | Jourdan |
| 4,096,908 A | 6/1978 | Lamy |

(Continued)

FOREIGN PATENT DOCUMENTS

| CN | 203577372 U | 5/2014 |
| CN | 204065039 U | 12/2014 |

(Continued)

OTHER PUBLICATIONS

Extended Search Report in European Patent Application No. 16762093.9, dated Nov. 6, 2018.
(Continued)

*Primary Examiner* — Marrit Eyassu
(74) *Attorney, Agent, or Firm* — Schmeiser, Olsen & Watts LLP

(57) ABSTRACT

A heater assembly used in chromatography includes a thermally conductive base having a chamber extending fully through the base with an opening at a first side of the base and at a second side of the base, and a cavity with an opening at the second side of the base. A heater is disposed within the cavity in thermal communication with the base. A thermistor assembly, having a thermistor within a thermally conductive body is disposed within the chamber. The body has a head region with a planar surface. The planar surface of the head (Continued)

region is exposed at the opening of the chamber at the first side of the base for making thermally conductive contact therewith. The thermistor assembly is thermally isolated from the base.

22 Claims, 14 Drawing Sheets

(58) Field of Classification Search
USPC .......................................................... 73/61.52
See application file for complete search history.

(56) References Cited

U.S. PATENT DOCUMENTS

| | | | |
|---|---|---|---|
| 4,167,334 A | | 9/1979 | Phillips |
| 4,167,663 A | | 9/1979 | Granzow, Jr. et al. |
| 4,222,900 A | * | 9/1980 | Bohl ........................ B01J 23/50 |
| | | | 216/108 |
| 4,541,269 A | | 9/1985 | Thomas |
| 4,851,683 A | | 8/1989 | Yang et al. |
| 4,982,597 A | | 1/1991 | Berger |
| 5,983,710 A | | 11/1999 | Uhen et al. |
| 9,310,308 B2 | * | 4/2016 | Paradis .................. G01N 21/68 |
| 2011/0290233 A1 | | 12/2011 | Iso et al. |
| 2013/0052083 A1 | * | 2/2013 | Kirby ...................... F24H 1/142 |
| | | | 422/70 |
| 2015/0196855 A1 | * | 7/2015 | Waldbaur ............... B01D 15/12 |
| | | | 210/198.1 |

FOREIGN PATENT DOCUMENTS

| | | |
|---|---|---|
| CN | 104807897 A | 7/2015 |
| EP | 0346565 A2 | 12/1989 |
| EP | 0384969 A2 | 9/1990 |
| EP | 0488371 A2 | 6/1992 |
| WO | 9912393 A1 | 3/1999 |
| WO | 0167080 A1 | 9/2001 |
| WO | 2011085359 A1 | 7/2011 |
| WO | 2015160650 A1 | 10/2015 |

OTHER PUBLICATIONS

International Search Report & Written Opinion in International Patent Application No. PCT/US16/16510, dated Apr. 14, 2016; 9 pages.
International Preliminary Report on Patentability in International Patent Application No. PCT/US16/16510, dated Sep. 21, 2017; 4 pages.

* cited by examiner

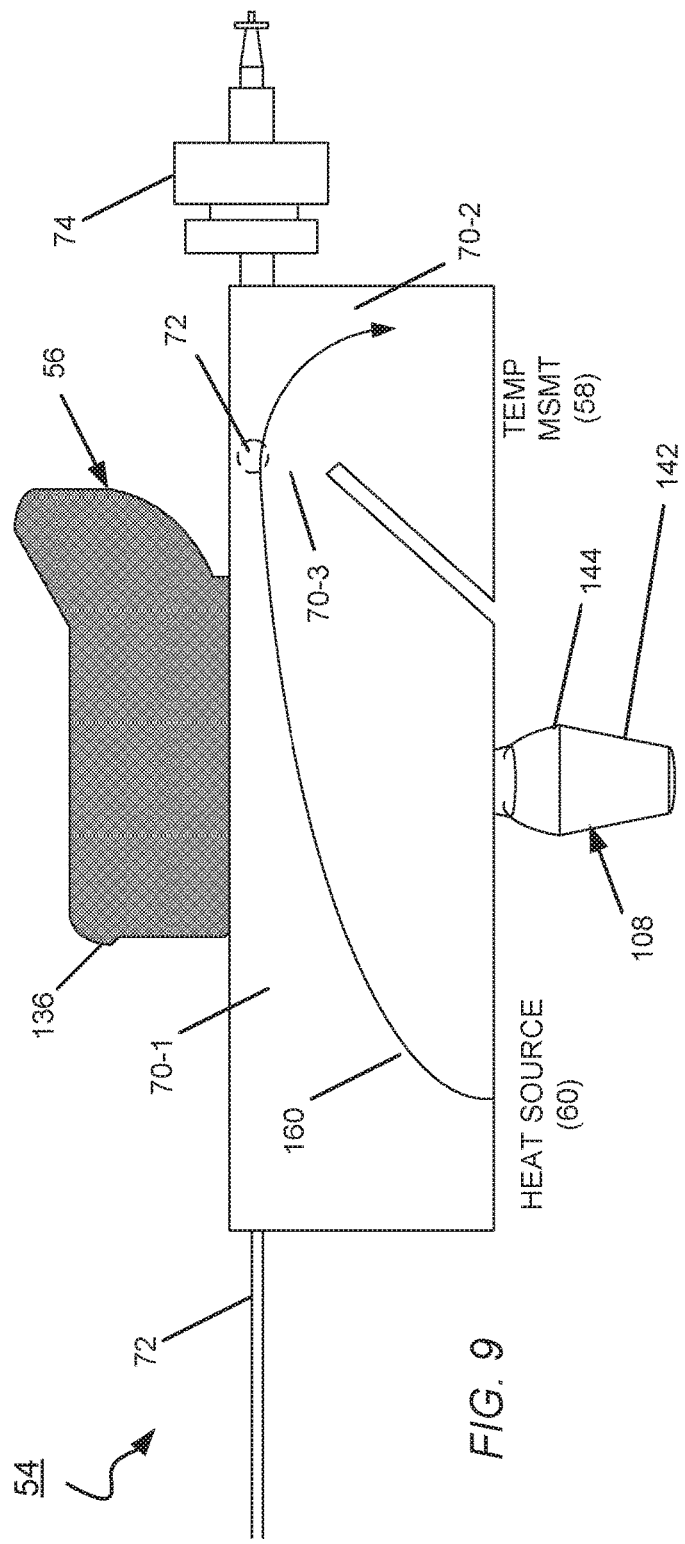
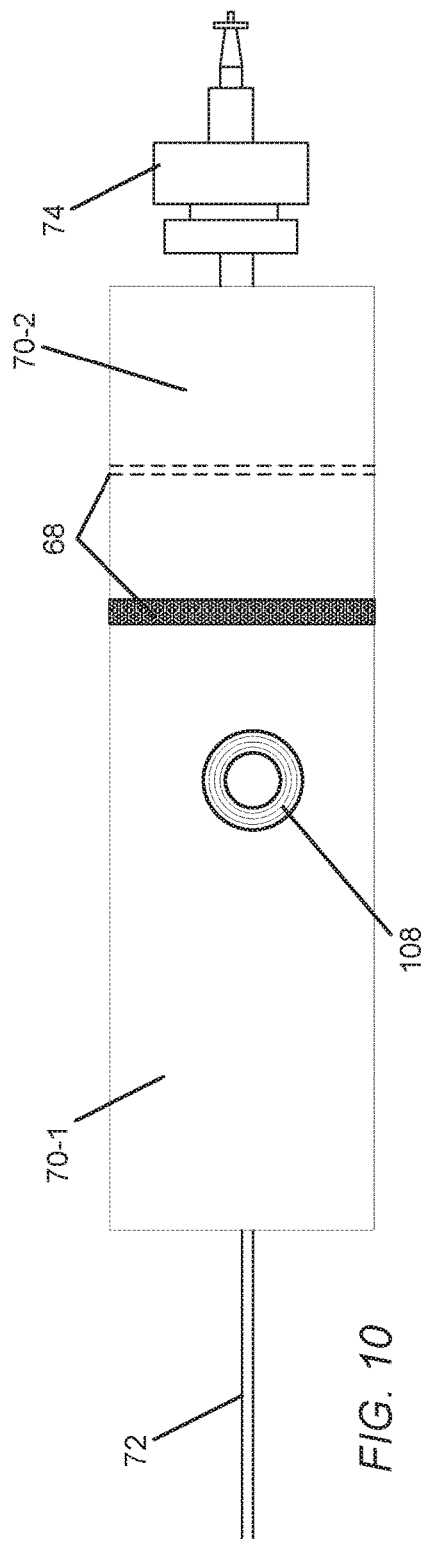

SOLVENT PREHEATING SYSTEM FOR LIQUID CHROMATOGRAPHY

FIELD OF THE INVENTION

The invention relates generally to chromatography systems. More specifically, the invention relates to systems and methods for preheating solvents before entering a column in a chromatographic system.

BACKGROUND

Chromatography is a set of techniques for separating a mixture into its constituents. Generally, in a liquid chromatography analysis, a pump system takes in and delivers a mixture of liquid solvents (and/or other fluids) to a sample manager, where a sample awaits injection into the solvents. The sample is the material under analysis. Examples of samples include complex mixtures of proteins, protein precursors, protein fragments, reaction products, and other compounds, to list but a few. In an isocratic chromatography application, the composition of the liquid solvents remains unchanged, whereas in a gradient chromatography application, the solvent composition varies over time. The mobile phase comprised of a sample dissolved in a mixture of solvents (and/or other fluids), moves to a point of use, such as a separation column, referred to as the stationary phase. By passing the mobile phase through the column, the various components in the sample separate from each other at different rates and thus elute from the column at different times. A detector receives the separated components from the column and produces an output from which the identity and quantity of the analytes may be determined.

Temperature can influence the results of the analysis, affecting such properties as the separation performance of the column and the viscosity of a mobile phase. Therefore, maintaining an accurate constant column temperature is important to the accuracy and reproducibility of the results. The manner by which the column temperature is controlled is an important factor. Convective column-heating systems can produce dispersion because the direct flow of air onto the columns interacts with internal viscous heating to produce radial gradients. An alternative to convective column-heating systems are heated trough designs. However, heated trough designs for long chromatography columns or series of columns can be expensive and a challenge to control.

In addition, accurate preheating of the fluid being delivered to the separation column can be critical to producing consistent retention times. If the temperature of the mobile phase supplied to the column is not constant, for example, for long (e.g., multi-hour) chromatographic runs where the variations in room temperature are significant, the accuracy of the chromatographic analysis can degrade. A device to pre-heat the mobile phase is sometimes used to reduce temperature fluctuations at the column inlet. However, exact control of the mobile phase is difficult to achieve with any system and often involves an offset. Current passive heaters are even less accurate because of lack of feedback.

SUMMARY

All examples and features mentioned below can be combined in any technically possible way.

In one aspect, a heater assembly is used for use in chromatography. The heater assembly comprises a thermally conductive base having a first side, a second side opposite the first side, a chamber extending fully through the base with an opening at the first side of the base and at the second side of the base, and a cavity with an opening at the second side of the base. A heater is disposed within the cavity in thermal communication with the base. A thermistor assembly is disposed within the chamber. The thermistor assembly has a thermistor within a thermally conductive body. The body has a head region with a planar surface. The thermistor assembly is disposed within the chamber such that the planar surface of the head region is exposed at the opening of the chamber at the first side of the base for making thermally conductive contact therewith. The chamber is wider than the head region of the body such that the thermistor assembly is thermally isolated from the base.

Embodiments may include one of the following features, or any combination thereof. The body of the thermistor assembly may further comprise a neck region adjacent the head region; and the thermistor assembly may further comprise a spring disposed around the neck region of the body between the head region and a surface within the chamber to produce a force that urges the planar surface of the head region out of the opening of the chamber at the first side of the base. The base may have a hole disposed between the cavity and the chamber, the hole being adapted to receive a plunger of a retention mechanism. This hole may have a circumferential pocket and further comprise a spring disposed in the pocket. This spring disposed in the pocket may be a slanted-coil spring. This hole may extend fully through the base with an opening at the first side of the base and an opening on the second side of the base; and the heater assembly may further comprise a plug disposed in the opening on the second side of the base to seal the base from liquid draining through the hole.

The base may have a second cavity adjacent the cavity with the heater; and the heater assembly may further comprise a safety switch disposed in the second cavity in thermal communication with the base for measuring temperature and disabling the heater should the measured temperature exceed a threshold.

The heater assembly may further comprise one or more alignment rails on the first side of the base for receiving corresponding alignment features of a fluidic block when joining the heater assembly to the fluidic block. A mounting plate may extend from one end of the first side of the base by which the heater assembly is secured to a column trough.

In another aspect, a chromatography column pre-heating apparatus comprises a thermally conductive fluidic block with a thermally conductive tube for conveying liquid. The tube extends from a first region of the fluidic block to a second region of the fluidic block. A heater assembly is coupled to the fluidic block. The heater assembly comprises a thermally conductive base having a cavity and a chamber. The cavity is disposed near the first region of the fluidic block and the chamber is disposed near the second region of the fluidic block. A heater of the heater assembly is disposed within the cavity in thermal communication with the base. The heater produces heat that propagates into the fluidic block. A thermistor assembly is disposed within the chamber of the base. The thermistor assembly has a temperature-sensing element substantially isolated thermally from the base. The thermistor assembly has a surface in thermal communication with the second region of the fluidic block to conduct heat from the second region of the fluidic block to the temperature-sensing element. The temperature-sensing element measures temperature of the second region of the fluidic block substantially uninfluenced by a temperature of the base because of the thermal isolation of the temperature-sensing dement from the base.

Embodiments of the chromatography column pre-heating apparatus may include one of the following features, or any combination thereof.

The thermistor assembly may include a spring adapted to urge the surface of the thermistor assembly against the fluidic block.

The fluidic block of the chromatography column pre-heating apparatus may have a hole extending from a first side of the fluidic block through to an opposite, second side of the fluidic block. The chromatography column pre-heating apparatus may further comprise a retention mechanism to couple the fluidic block to the base. This retention mechanism may include a lever mechanism movably abutting the first side of the fluidic block and a shaft coupled to the lever mechanism. The shaft extends through the hole in the fluidic block. The retention mechanism may further include a plunger portion coupled to the shaft and extending from the second side of the fluidic block. The lever mechanism may have a first position that extends the plunger portion from the hole and a second position that retracts the plunger portion towards the hole.

The base may have a hole with a circumferentially disposed spring for receiving the plunger portion. This spring may be a slanted-coil spring.

Alternatively, the base may have a second cavity for receiving the plunger portion and a pin that extends across the second cavity. The retention mechanism may have a spring disposed around the shaft to urge the plunger portion into the second cavity of the base. The plunger portion of the retention mechanism may have one or more grooves that receive the pin when the plunger portion turns within the second cavity in response to a 90-degree turn of the lever mechanism. The plunger portion may have one or more prongs, and the fluidic block may have an external surface that faces the thermal base when the fluidic block is coupled to the thermal base. The external surface of the fluidic block may have one or more ramps cast around the hole of the fluidic block. Each ramp has a notch for receiving one of the one or more prongs of the plunger portion when the retention mechanism is turned to the first position.

The chromatography column pre-heating apparatus may further comprise a thermal gasket disposed between the first region of the fluidic block and the base and between the surface of the thermistor assembly and the second region of the fluidic block. The base may have a second cavity near the cavity with the heater, and the chromatography column pre-heating apparatus may further comprise a safety switch disposed in the second cavity in thermal communication with the base for measuring temperature and disabling the heater should the temperature measured by the safety switch exceed a threshold. In addition, the fluidic block may be detachable from the base.

In another aspect, a chromatography column module comprises a chromatography column and a pre-heating apparatus coupled to the chromatography column. The pre-heating apparatus comprises a thermally conductive fluidic block with a thermally conductive tube for conveying liquid. The tube is coupled at one end to the chromatography column and extends from a first region of the fluidic block to a second region of the fluidic block near the end of the tube coupled to the chromatography column. A heater assembly is coupled to the fluidic block. The heater assembly comprises a thermally conductive base having a cavity and a chamber. The cavity is disposed opposite the first region of the fluidic block and the chamber is disposed opposite the second region of the fluidic block. A heater is disposed within the cavity in thermal communication with the base. The heater produces heat that propagates into the fluidic block. A thermistor assembly is disposed within the chamber of the base. The thermistor assembly has a temperature-sensing element substantially isolated thermally from the base. The thermistor assembly has a surface in thermal communication with the second region of the fluidic block to conduct heat from the second region of the fluidic block to the temperature-sensing element. The temperature-sensing element measures temperature of the second region of the fluidic block substantially uninfluenced by a temperature of the base because of the thermal isolation of the temperature-sensing element from the base.

Embodiments of the chromatography column module may include one of the following features, or any combination thereof. The thermistor assembly of the heater assembly may include a spring adapted to urge the surface of the thermistor assembly against the fluidic block.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIG. 9 is a side view of the fluidic block of FIG. 5.

FIG. 10 is a bottom view of the fluidic block of FIG. 5.

DETAILED DESCRIPTION

Figure 1:
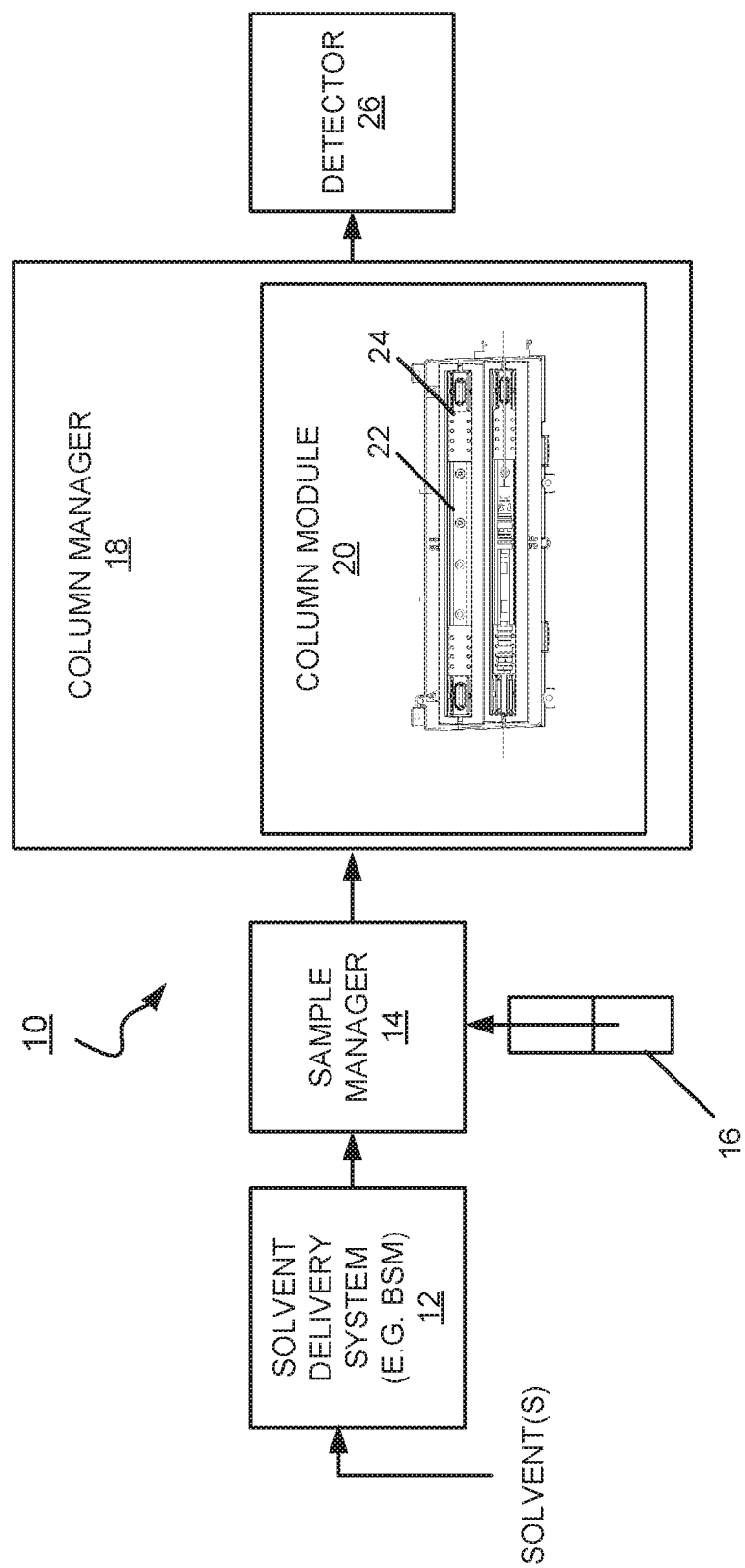
FIG. 1 is a block diagram of an embodiment of a chromatography system.

Embodiments of active pre-heaters described herein include two-piece systems with one piece being a heating (or thermal) base and a second piece being a fluidic block. The fluidic block is a disposable component that houses tubing, which may be cast or bonded into the fluidic block. Making the fluidic block removable advantageously allows for ease of access to connect columns in space-limited locations. The fluidic block has no electrical components, and can, in this sense, be considered passive; the electrical components for controlling the temperature of the fluidic block reside in the thermal base. By embedding all electrical components into a stationary piece built into a column module and having the tubing reside in the separately removable component (i.e., fluidic block), the active pre-heater attains isolation between potential leak source and electrical paths.

The thermal base includes a heater and a controlling temperature-sensing element (or thermistor) assembly. To adjust the temperature of the pre-heater assembly accurately, the measurements made by the thermistor assembly should reflect the temperature of the fluid passing through the tubing. Thermally isolating the thermistor assembly from direct contact with the adjacent heat source in the thermal base enables accurate temperature measurement and any consequent adjustments. The thermistor assembly is spring-loaded to urge thermally conductive contact with the fluidic block in order to read its temperature. In addition, the thermistor assembly is thermally isolated from the thermal base and, thus, reads the temperature with minimal influence from the heated thermal base.

Thermal breaks and engineered heat flow paths in the fluidic block facilitate accurate temperature measurement corresponding to the temperature of the fluid in the tube. A thin cut thermal break in the fluidic block, for example, accompanied by a transverse running section of tubing, forces a heat path through the fluidic path of an active pre-heater before reaching the controlling thermistor assembly. A narrow gap produced by the thermal break, partially blocked by the fluidic tubing across its length, provides a controllable thermal passage. In addition, the side of the thermal base interfacing the electronics is sealed to isolate the electronics from any leakage from the fluidic block. Although designed primarily as an active pre-heater, the apparatus described herein can also operate to cool passively liquid flowing through the fluidic block.

A breakaway attachment mechanism couples the fluidic block to the thermal base. In one embodiment, the attachment mechanism includes a slanted coil spring and a contoured plunger. The shape of the plunger is designed to provide a constant force over a range of tolerances of the fluidic block and thermal base to ensure a consistent gasket compression force. The plunger design does not permit partial insertion into the thermal base and pushes the fluidic block away from the thermal base if not fully installed because of the insertion slope on the plunger. The attachment mechanism produces a tactile snap when the plunger is fully inserted into the spring. The snap connection between the plunger and spring breaks away should a user pull on the column, thereby preventing damage to the active pre-heater. Other embodiments can use different types of springs, for example, a U-shaped spring, a ribbon spring. In addition, the attachment mechanism can alternatively be implemented with a quarter-turn fastener, a bayonet style thumb screw, a threaded thumb screw, or a folded sheet clip. In general, the attachment mechanism can be used for any assembly involving thermal contact, being particularly useful when there are user interface parts, for example, passive pre-heaters, direct column heaters, and sample holders.

FIG. 1 shows an embodiment of a liquid chromatography system 10 for separating a sample into its constituents. The liquid chromatography system 10 includes a solvent delivery system 12 in fluidic communication with a sample manager 14. Generally, the solvent delivery system 12 includes a pump (not shown) in fluidic communication with solvent reservoirs from which the pump draws solvents. The solvent delivery system 12 delivers a mixture of solvents to the sample manager 14. The sample manager 14 is in fluidic communication with a sample source 16 from which the sample manager acquires and introduces a sample to the solvent composition arriving from the solvent delivery system 12. The sample-solvent composition passes to a column manager 18.

The column manager 18 generally provides a controlled temperature environment for one or more chromatography separation columns used in separating sample-solvent compositions. Each separation column is adapted to separate the various components (or analytes) of the sample from each other as the mobile passes through, and to elute the analytes (still carried by the mobile phase) from the column at different times. Embodiments of the separation column include a variety of sizes (e.g., preparative, semi-preparative, analytical, or capillary-scale packed-bed columns or open tubular columns) and a variety of preparations (e.g., in conventional metallic, fused silica, or polymeric tubes, or in metallic, ceramic, silica, glass, or polymeric microfluidic platforms or substrates of various IDs).

The column manager 18 includes a column module 20 that houses one or more thermally conductive troughs 22. Each trough 22 is adapted to hold one or more chromatography columns therein. Either or both ends of each trough 22 have a socket 24 adapted to receive a pre-heater assembly. A pre-heater assembly operates to preheat liquid before the liquid passes to a column disposed within that trough. One example implementation of such a column manager is described in U.S. patent application Ser. No. 13/519,818, filed Jan. 11, 2011, titled, "Column Heater with Active Pre-heating," the entirety of which application is incorporated by reference herein.

From the column manager 18, the constituents of the separated sample pass to a detector 26 or other equipment, for example, a mass spectrometer or a Flame Ionization Detector (HD), for analyzing the separation. The solvent delivery system 12, sample manager 14, column manager 18, and detector 26 may be separate instruments or integrated into a single unit.

Figure 2:
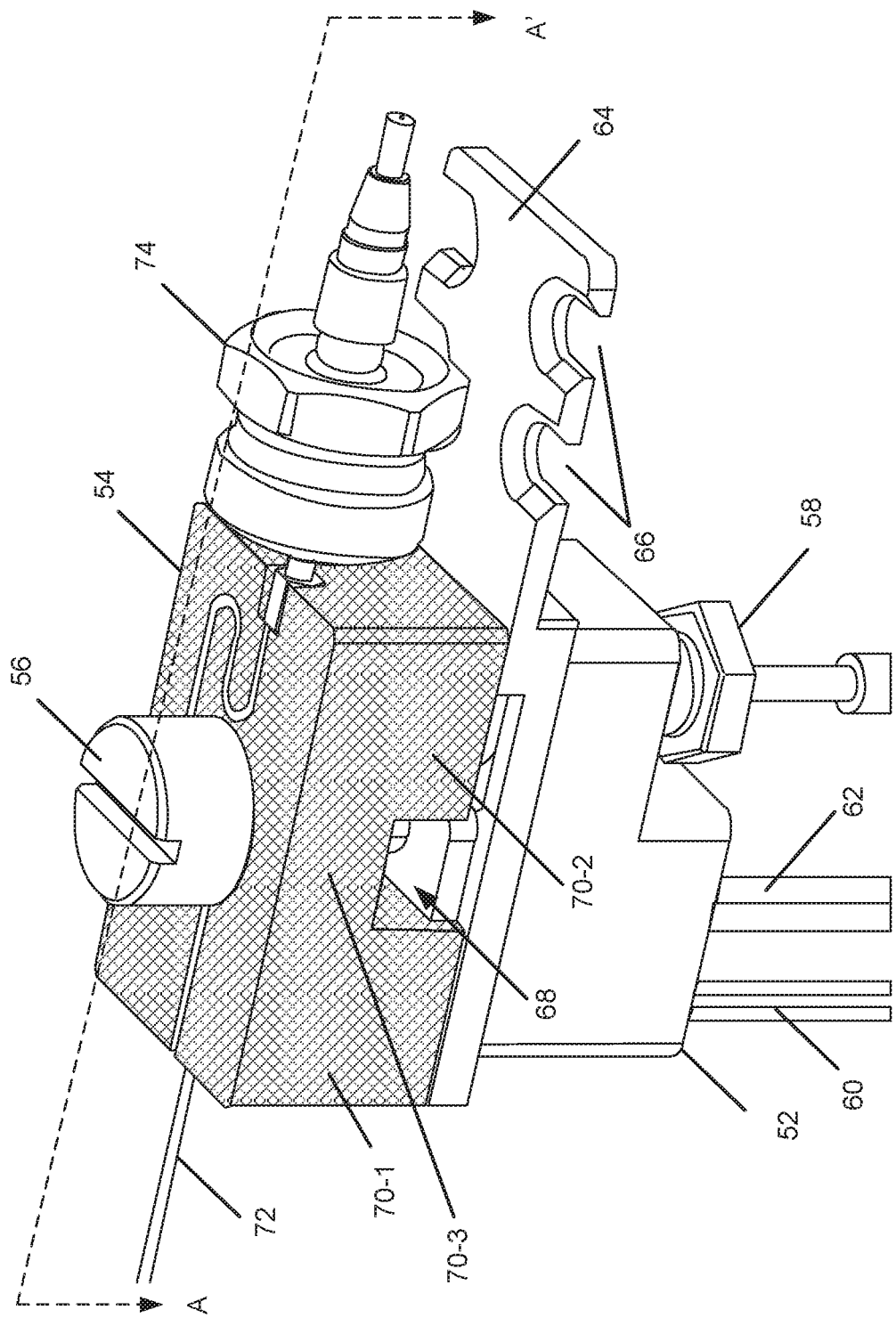
FIG. 2 is an elevated side view of an embodiment of an active pre-heater assembly used to preheat liquid before the liquid enters a chromatography column.

FIG. 2 shows an elevated side view of an embodiment of an active pre-heater assembly 50 that can be used to preheat liquid before the liquid enters a chromatography column. The active pre-heater assembly 50 includes a thermally conductive thermal base 52, a thermally conductive fluidic block 54, and a retention mechanism 56 that holds the thermal base 52 in thermal communication with the fluidic block 54. A thermal gasket (not shown) may be disposed at select regions between the thermal base 52 and the fluidic block 54.

All electronics for controlling the active pre-heater assembly 50 reside in the thermal base 52; the fluidic block 54 has no electrical components and is separately disposable. Advantageously, this absence of electrical components supports a low cost for the fluidic block, particularly making it more readily disposable than if the fluidic block included electronics. This absence also furthers safety by keeping the electronics of the pre-heater assembly 50 away from solvent vapors.

Circuitry (not shown) is in electrical communication with a thermistor assembly 58 (a portion is visible), a heater 60 (only wires are visible), and a safety switch 62 (only wires are visible) embedded within the thermal base 52. As described in more detail below, the thermistor assembly 58 is in thermal communication with the fluidic block 54 and substantially thermally isolated from the thermal base 52.

This thermal isolation ensures that the temperature of the fluidic block 54 measured by the thermistor assembly 58 is substantially uninfluenced by the temperature of the thermal base 52. Extending from one side of the thermal base 52 is a mounting plate 64 with holes 66 through which screws can secure the active pre-heater assembly 50 to a corresponding holes in a column trough 22 (FIG. 1).

The fluidic block 54 is generally rectangular in shape and may have a cutout section 68 formed therein that forms a thermal break between regions 70-1, 70-2 of the fluidic block 54. The thermal break operates to guide and concentrate the flow of heat from one region 70-1 to the other region 70-2 through a thin region 70-3 of the fluidic block 54 formed by the cutout section 68. This thin region 70-3 resides "above" the cutout section 68 between the first and second regions 70-1, 70-2. It is to be understood that such terms like above, below, upper, lower, left, right, top, bottom, front, and rear are relative terms used for purposes of simplifying the description of features as shown in the figures, and are not used to impose any limitation on the structure or use of the active pre-heater assembly 50. In addition, although described in terms of discrete first, second, and thin regions 70-1, 70-2, and 70-3, respectively, the fluidic block 54 is an integral unit; the dividing of the fluidic Hock 54 into regions is for facilitating the description. Some embodiments of the active pre-heater assembly 50 may lack a cutout section 68, and, hence, have no corresponding thin region 70-3. Tubing 72 extends through the first, second, and thin regions 70-1, 70-2, 70-3, respectively, of the fluidic block 54, taking a serpentine path, and coupling to a column fitting 74 for making a fluidic connection with a chromatography column. The tubing 72 may be cast or diffusion bonded into the fluidic block 54. The fluidic block 54, with the tubing 72 and column fitting 74, can be an integral unit (i.e., distributed or sold as a single component).

The heater 60 and safety switch 62 within the thermal base 52 are disposed directly opposite the first region 70-1 of the fluidic block 54, where the liquid in the tubing 72 first enters the fluidic block 54. The thermistor assembly 58 within the thermal base 52 is disposed directly opposite the second region 70-2 of the fluidic block 54, where the liquid in the tubing 72 leaves the fluidic block 54.

The retention mechanism 56 includes a screw that enters an appropriately sized opening (obscured by the head of the screw) in a top side of the fluidic block 54, passes entirely through the fluidic Hock 54, and fastens into an appropriately sized opening in a top side of the thermal base 52.

In brief overview, liquid from the sample manager 14 (FIG. 1) flows through the tubing 72 to the column fitting 74. The other end of the tubing 72, opposite the column fitting 74, can also have a fitting for coupling to the sample manager 14. Circuitry actively controls the temperature of the thermal base 52 by controlling operation of the heater 60. The safety switch 62 measures the temperature of the thermal base 52 near the heater 60 and may operate to disable the heater 60 should its measured temperature exceed a threshold. The thermally conductive thermal base 52 conducts the heat generated by the heater 60 to the fluidic block 54, predominantly through the first region 70-1. Heat flows from the first region 70-1 of the fluidic block to the second region 70-2 of the fluidic block across the thin region 70-3 (if there is a cutout region 68 forming a thermal break). In general, substantially no heat flows directly from the thermal base 52 to the second region 70-2 of the fluidic block 54; other than with the thermistor assembly 58, which is thermally isolated from the thermal base 52, the second region 70-2 of the fluidic block 54 makes substantially no thermally conductive contact with the thermal base 52. The thermistor assembly 58 measures the temperature of the second region 70-2 of the fluidic block 54, where the liquid in the tubing 72 enters the column fitting 74. This measured temperature closely or exactly corresponds to the temperature of the liquid in the tubing 72 as the liquid enters the column fitting 74.

Figure 3:
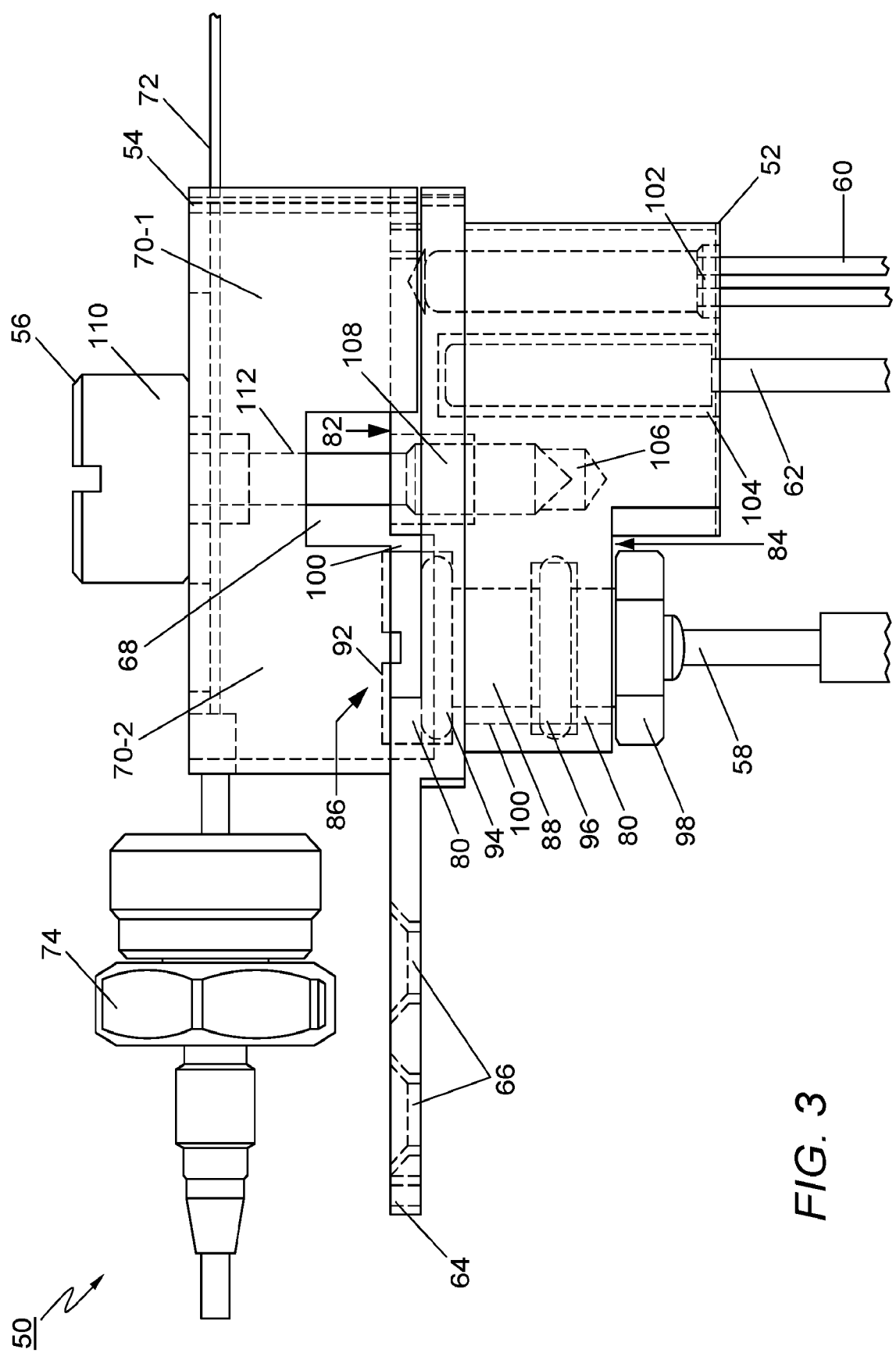
FIG. 3 is a transparent side view of the embodiment of the active pre-heater assembly 50 of FIG. 2, including a thermal base and a fluidic block.

FIG. 3 shows a transparent side view of the embodiment of the active pre-heater assembly 50 of FIG. 2, including the thermally conductive thermal base 52, thermally conductive fluidic block 54, and retention mechanism 56. The thermal base 52 has a chamber 80 for receiving the thermistor assembly 58. The chamber 80 extends through a thickness of the thermal base 52, from a top side 82 that interfaces the fluidic block 54 through to a bottom side 84 through which the wires of the various electrical components extend.

One embodiment of the thermistor assembly 58 includes a body comprised of a spring-loaded screw 86 having a neck region 88 below a slotted head region 90. The head region 90 has a generally planar surface 92 (with, for example, a screwdriver slot) that extends above the plane of the top side 82 of the thermal base 52. A temperature-sensing element (or thermistor) is housed within and in thermal communication with the neck and head regions 88, 90, respectively, of the screw 86. An air gap 100 surrounds the head region 90 and most of the neck region 88 to facilitate thermally isolating these regions from the thermal base 52.

A spring 94 is disposed around the neck region 88 under the head region 90 of the screw 86. The action of the spring 94 resists any force applied to the head region 90 that urges the screw 86 into the chamber 80, such as occurs when joining the fluidic block 54 to the thermal base 52. The spring 94 counters such force by urging the generally planar surface 92 against the underside of the fluidic block 54. Embodiments of the spring 94 include, but are not limited to, a canted-coil spring, a coil spring, and an o-ring. The screw 86 "floats" within the chamber 80 on this spring 94.

An O-ring 96 can be disposed around the lower portion of the neck region 88 of the screw 86 to block any leakage from propagating through the bottom side 84 towards the electronics of the thermistor assembly 58. Alternatively, drainage features can be used instead of a seal. A nut 98 secures the thermistor assembly 58 to the thermal base 52 from the bottom side 84.

The thermal base 52 also has a first cavity 102 for receiving the heater 60, a second cavity 104 for receiving the safety switch 62, and a third cavity 106 for receiving a plunger portion 108 of the retention mechanism 56. The first and second cavities 102, 104 open on the bottom side 84, and do not have an opening on the top side 82 (thereby, not providing a leakage path), whereas the third cavity 106 has an opening on the top side 82. The retention mechanism 56 also includes a slotted head portion 110 and a shaft 112 with the plunger portion 108 at its end. In this example, the shaft 112 extends through the thin region 70-3 of the fluidic block 54. Threads of the plunger portion 108 tighten within the third cavity 106 and anchor the fluidic block 54 to the thermal base 52. With the thermal base 52 in thermal communication with the fluidic block 54, as shown, the heater 60 in the first cavity 102 almost abuts the underside of the first region 70-1 of the fluidic block 54 and the exposed planar surface 92 of the head region 90 of the thermistor assembly 58 abuts the underside of the second region 70-2 of the fluidic block 54.

Figure 4:
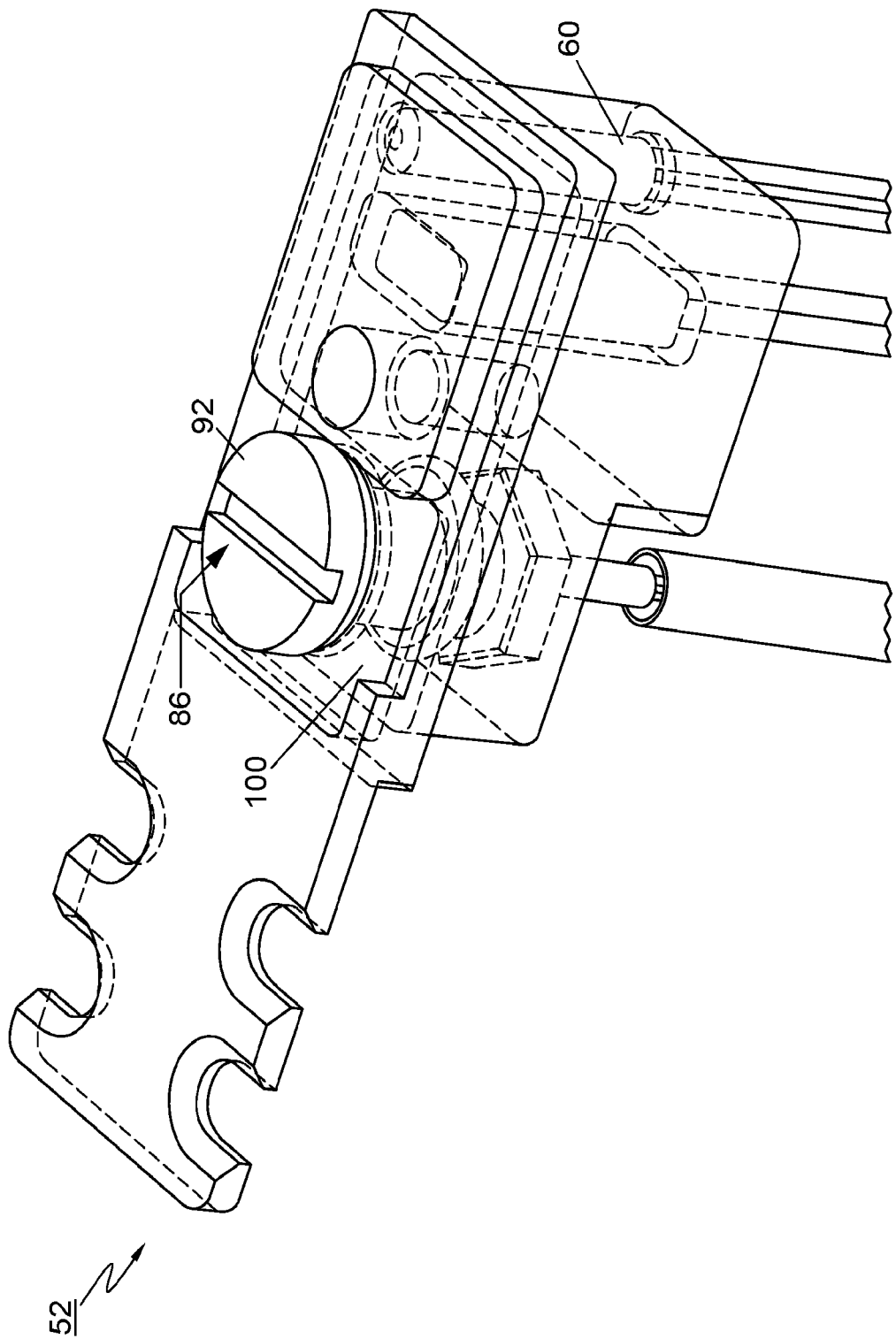
FIG. 4 is an elevated view of the embodiment of the thermal base.

FIG. 4 shows an elevated view of the embodiment of the thermal base 52 to illustrate further the air gap 100 surrounding the head region 90 of the spring-loaded screw 86 in order to provide thermal isolation of the thermistor assembly 58 from the thermal base 52. The air gap 100 operates to insulate the head region 90 from the heat conducted by the thermal base 52 from the heater 60.

Figure 5:
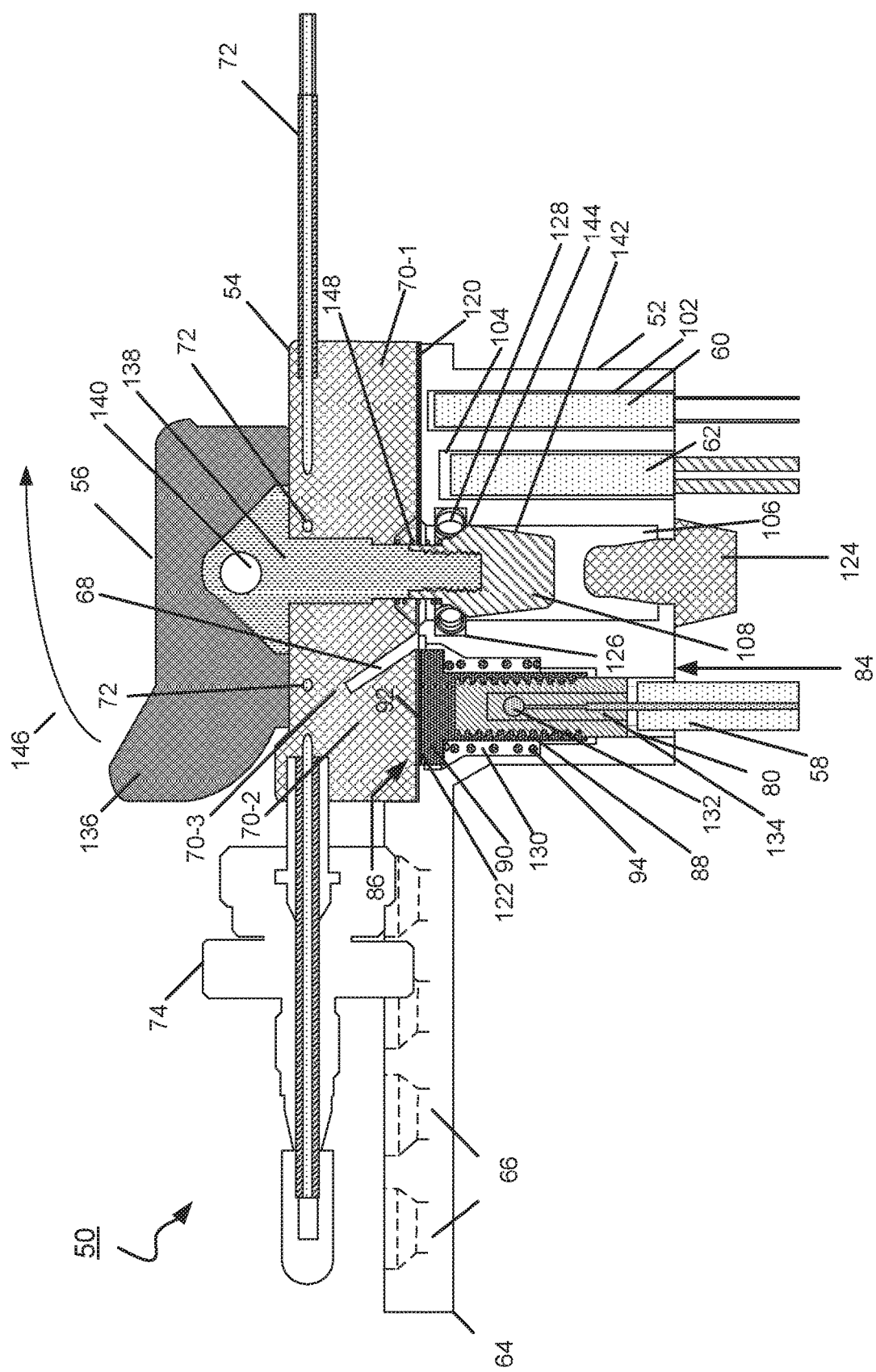
FIG. 5 is a cross-sectional side view of another embodiment of an active pre-heater assembly including a thermal base and fluidic block.

FIG. 5 shows a cross-sectional side view of another embodiment of an active pre-heater assembly 50. The cross-sectional side view is along a line similar to and reverse of the line A-A' in FIG. 2. This embodiment of active pre-heater assembly 50 includes a thermally conductive thermal base 52, a thermally conductive fluidic block 54, and a retention mechanism 56 that holds the thermal base 52 in thermal communication with the fluidic block 54. A thermal gasket 120 is disposed between the region 70-1 of the thermal base 52 and the fluidic block 54. Another thermal gasket 122 is disposed between the region 70-2 of the thermal base 52 and the head region 90 of the thermistor assembly 58. This gasket 122 is sized appropriately to match the dimensions of the planar surface 92 of the head region 90, thereby thermally coupling the region 70-2 of the thermal base 52 with the head region 90, but with substantially no other portion of the thermal base 52.

Similar to the example of FIG. 2, all electronics for controlling the active pre-heater assembly 50 of FIG. 5 reside in the thermal base 52, and the fluidic block 54 has no electrical components and is separately disposable. The thermal base 52 has a chamber 80 for receiving the thermistor assembly 58, a first cavity 102 for receiving the heater 60, a second cavity 104 for receiving the safety switch 62, and a third cavity 106 for receiving the plunger portion 108 of the retention mechanism 56. A plug 124 seals the end of the third cavity 106 at the bottom side 84 of the thermal base 52. The third cavity 106 also includes a circumferential pocket 126 within which is disposed a slanted-coil spring 128. (Other embodiments include, but are not limited to, a ribbon spring). A mounting plate 64 with holes 66 extend from one side of the thermal base 52. Fasteners inserted through these holes 66 can secure the active pre-heater assembly 50 to a corresponding holes in a column trough 22 (FIG. 1).

This example of the fluidic block 54 is generally rectangular in shape (about 1 to 2 inches in length, and less than 1 inch in width) and has a cutout section 68 formed diagonally in the fluidic block 54. The cutout region 68 is a thin slice or cleft at approximately a minus 45 degree angle with respect to a bottom side of the fluidic block 54 (the cleft angles upwards towards the liquid-egress end of the fluidic block 54). The air gap produced by the cleft forms a thermal break between regions 70-1, 70-2 of the fluidic block 54. In addition, the thinness of the cleft does not consume much area of the fluidic block used to heat the liquid passing through the tubing 72. The thermal break operates to guide and concentrate the flow of heat from one region 70-1 to the other region 70-2 through a thin region 70-3 of the fluidic block 54 formed by the cutout section 68. This thin region 70-3 resides "above" the cutout section 68 between the first and second regions 70-1, 70-2. Again, some embodiments of the active pre-heater assembly 50 may lack a cutout section 68, and, hence, have no corresponding thin region 70-3.

Tubing 72 extends through the first, second, and thin regions 70-1, 70-2, 70-3, respectively, of the fluidic block 54, taking a serpentine path, and coupling to a column fitting 74. Some lengths of the tubing 72 run perpendicular to the plane shown in FIG. 5 and appear as circles 72 in the cross-sectional drawing. One of the circles corresponding to the tubing 72 appears in the thin region 70-3 of the fluidic block 54, to enhance heating of the liquid in the tubing 72, as described in more detail in connection with FIG. 9. The tubing 72 may be cast or diffusion bonded into the fluidic block 54, and the fluidic block 54, with the tubing 72 and column fitting 74, can be an integral unit (i.e., distributed or sold as a single component).

The heater 60 and safety switch 62 disposed within the thermal base 52 are directly opposite the first region 70-1 of the fluidic block 54, where the liquid in the tubing 72 first enters the fluidic block 54. The thermistor assembly 58 within the thermal base 52 is disposed directly opposite the second region 70-2 of the fluidic block 54, where the liquid in the tubing 72 leaves the fluidic block 54.

This example of the thermistor assembly 58 includes a spring-loaded screw (or fitting) 86 having a neck region 88 below a head region 90. The head region 90 has a generally planar surface 92. A spring 94 is disposed in a pocket 130 around the neck region 88 under the head region 90 to resist any force applied to the head region 90 that urges the screw 86 into the chamber 80, such as occurs when joining the fluidic block 54 to the thermal base 52. The spring 94 operates to urge the generally planar surface 92 against the underside of the fluidic block 54. The inner diameter of the chamber 80, contoured to follow the shape of the neck and head regions 88, 90, is slightly larger than the outer diameters of the head region 90 and neck region 88, to provide a surrounding air gap that facilitates thermally isolating these regions from the thermal base 52. The screw 86 "floats" within the chamber 80 on this spring 94, substantially isolated thermally from the thermal base 52.

A temperature sensing component 132 is housed within a hollow 134 of the neck region 88. In response to the application and removal of force applied on the spring 94, the spring-loaded screw moves down or up within the pocket 130 in the chamber 80; conversely, the temperature sensing component 132 moves correspondingly up or down within the hollow 134 of the neck region 88. With the screw 86 fully depressed within the chamber 80, the temperature sensing component 132 can make physical contact with the interior ceiling and sides of the hollow 134 to place the temperature sensing component 132 in thermally conductive contact with the neck region 88; accordingly, heat conducted through the head region 90 reaches the thermal sensing component 132. The thermal isolation provided by the air gap surrounding the head region 90 ensures that the temperature measured by the temperature sensing component 132 is predominantly determined by the temperature of the fluidic block 54, specifically, of the region 70-2 where the liquid passing through the tubing 72 leaves the fluidic block 54 and enters the column fitting 74.

Other techniques may be employed to thermally isolate the thermistor assembly 58 from the thermal base 52. Instead of floating on a spring, the screw 86 can be wrapped in a plastic insulator, mounted on thermally isolated components, or spatially separated from the chamber walls with rubber o-rings and plastic components. Advantageously, use of the spring 94 ensures physical contact of the underside of the fluidic block 54 by the planar surface 92 of the screw 86; the spring 94 compensates for tolerances in the manufacture of the thermal base 52 and fluidic block 54.

This example of retention mechanism 56 includes a finger-manipulated lever 136 coupled to a contoured plunger portion 108 by a shaft 138. The plunger portion 108 has a tapered end 142 that widens up to a shoulder 144 and then narrows to a neck above the shoulder 144. This shape of the plunger is designed to provide a constant force over a range of tolerances of the fluidic block 54 and thermal base 52 to ensure a consistent gasket compression force. In one embodiment, the plunger portion 108 is constructed of a resilient material, like some plastics. A spring 148 is disposed around the shaft 138 and around the neck of the plunger portion 108.

The finger-manipulated lever 136 is rotatable about an axis defined by a pin 140 that couples the lever 136 to the shaft 138. A user pushes on the lever 136 to couple the fluidic block 54 to the thermal base 52. When the fluidic block 54 is joined to the thermal base 52, the finger-manipulated lever 136 lays flush on the surface of the fluidic block 54, as shown. Rotating the lever 136 about the pin 140 in the direction indicated by the arrow 146 operates to provide enough leverage to pull the plunger portion 108 out of the spring 128, thereby separating the fluidic block 54 from the thermal base 52.

When the retention mechanism 56 operates to join the fluidic block 54 to the thermal base 52, the plunger portion 108 penetrates the third cavity 106 of the thermal base 52. The tapered end 142 of the plunger portion 108 passes through the ring formed by the spring 128. The width of the plunger portion 108 at the shoulder 144 is wider than the ring formed by the spring 128; accordingly, the plunger portion 108 meets resistance when the shoulder 144 comes into contact with the spring 128. With additional force on the lever 136, the shoulder 144 deforms the spring 128 sufficiently to push through the ring. When the plunger portion 108 penetrates the ring beyond its shoulder 144, the plunger portion 108 pulls itself into the spring 128, producing a tactile "snap", with the spring 128 springing back to its normal shape around the shoulder 144 of the plunger portion 108. The snap assures the user that the fluidic block 54 is properly joined to the thermal base 52. In addition, the shape of the plunger portion 108 does not permit partial insertion into the spring 128; the insertion slope on the plunger portion 108 pushes the fluidic block 54 away from the thermal base 52 if the shoulder 144 of the plunger portion 108 is not fully installed within the spring 128.

The snap connection between the plunger portion 108 and the spring 128 will also break away non-destructively should a user pull on the column. The fluidic block 54 decouples from the thermal base 52 when the force pulling the plunger portion 108 and spring 128 apart exceeds the force of the spring 128 holding the plunger portion 108 in place. This breakaway attachment mechanism prevents damage to the active pre-heater assembly 50.

Other embodiments of retention mechanisms 56 that may be used include, but are not limited to, thumbscrews and bayonet grip screws. Some embodiments can permanently attach the fluidic block 54 to the thermal base 52, in which instances, the fluidic block 54 is not separately disposable.

Figure 6:
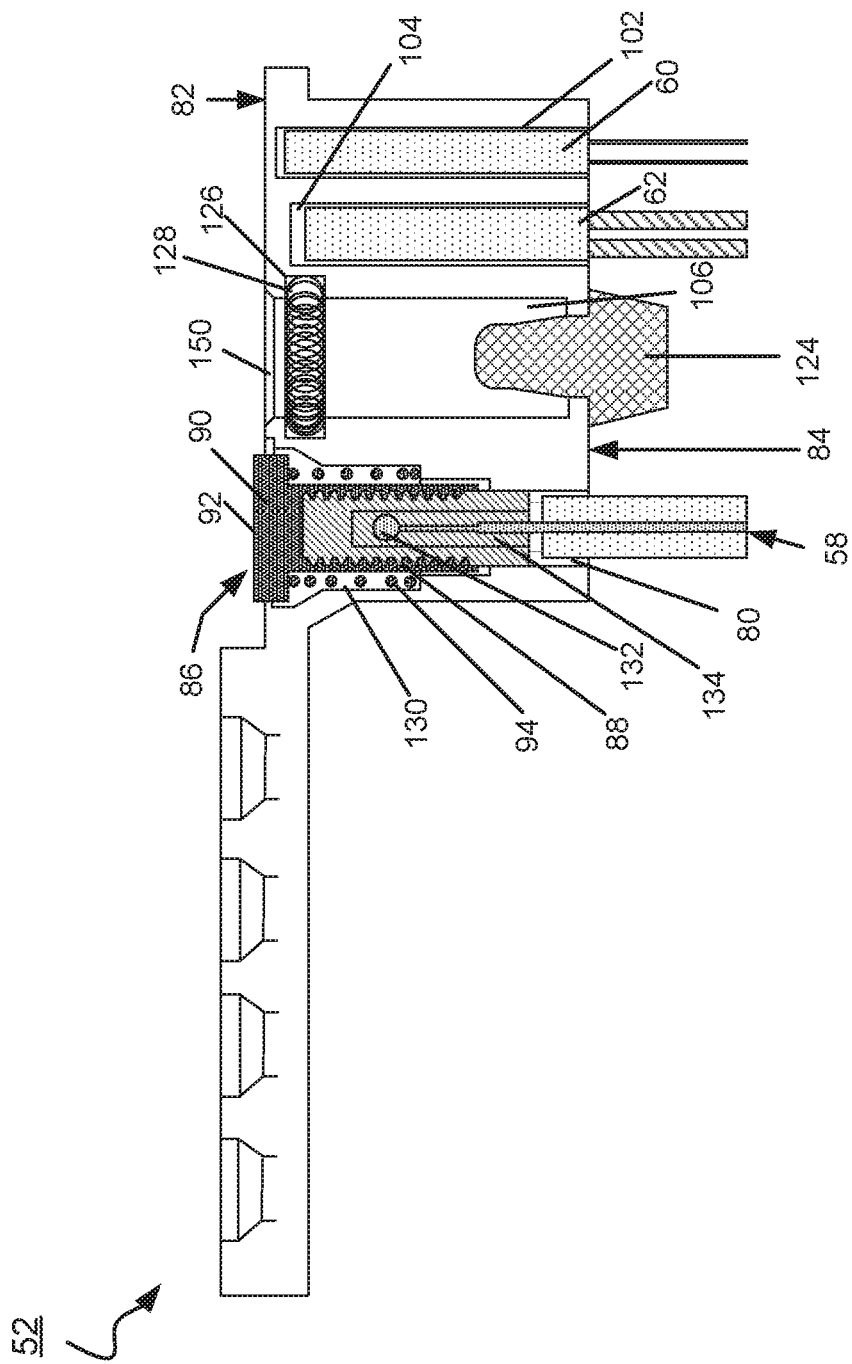
FIG. 6 is a cross-sectional side view of the thermal base of FIG. 5, separated from the fluidic block.

FIG. 6 shows the cross-sectional side view of the thermal base 52 of FIG. 5, separated from the fluidic block 54. When the thermal base 52 is not joined to the fluidic block 54, the spring 94 around the neck region 88 of the thermistor assembly 58 urges the head region 90 of the spring-loaded screw 86 out of the chamber 80. As a result, the planar surface 92 of the head region 90 is above the plane of the top side 82 of the thermal base 52. This same force of the spring 94 urges the planar surface 92 against the bottom of the fluidic base 54 when the two pieces (52, 54) are joined.

Also shown is a top-side opening 150 into the third cavity 106 of the thermal base 52 into which the plunger portion 108 enters when the thermal base 52 and fluidic block 54 are joined. This view also illustrates the position of the slanted-coil spring 128 within the pocket 126 in the third cavity 106 near its opening 150.

Figure 7:
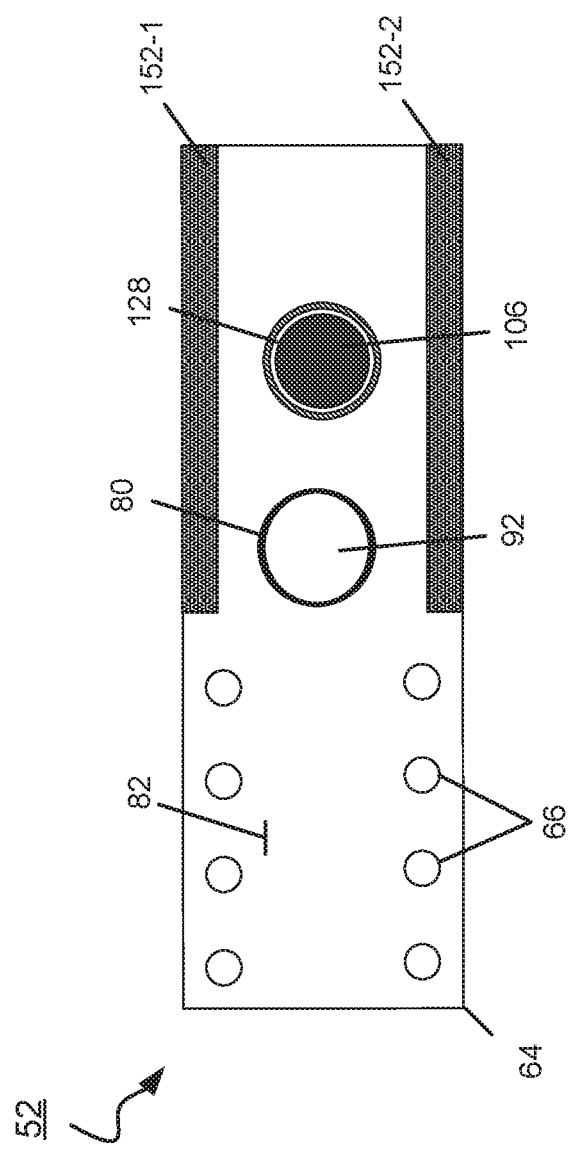
FIG. 7 is a plan view of the thermal base of FIG. 5.

FIG. 7 shows a plan view of the thermal base 52 of FIG. 5, showing the mounting plate 64 with holes 66, the planar surface 92 of the spring-loaded screw 86 within the chamber 80, and the opening 150 into the third cavity 106 that has the pocket 126 with the slanted-coil spring 128. Rectangular depressions 152-1, 152-2 serve as rails used to align and receive corresponding edges of the fluidic block 54 (for when the base 52 and block 54 are joined).

Figure 8:
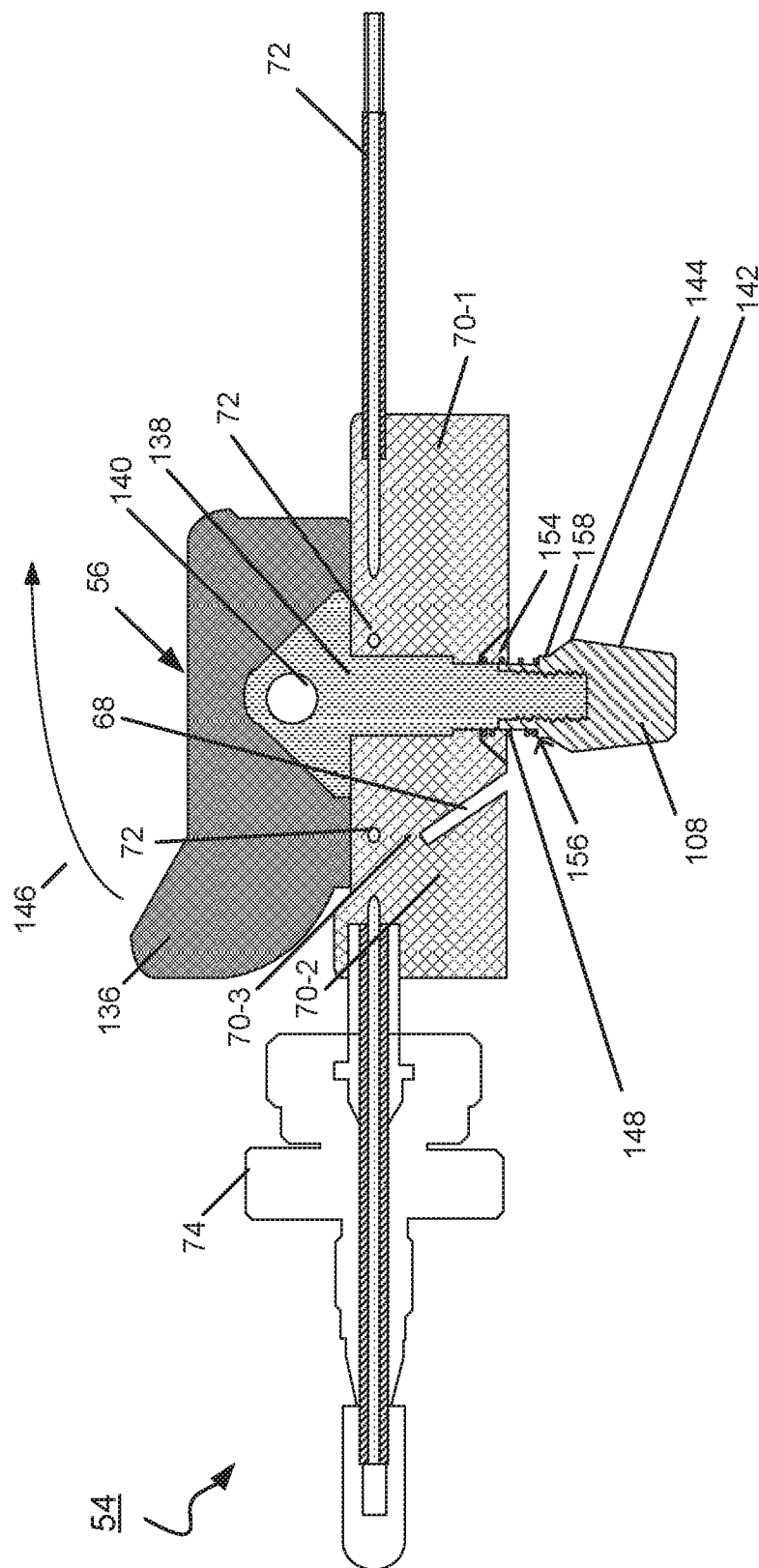
FIG. 8 is a cross-sectional side view of the fluidic block of FIG. 5.

FIG. 8 shows the cross-sectional side view of the fluidic block 54 of FIG. 5, separated from the thermal base 52. This view more clearly shows the spring 148 disposed around the shaft 138 of the retention mechanism 56. The spring 148 is lodged between a recess 154 within the fluidic block 54 and a rim 156 around the neck 158 of the plunger portion 108. The spring 148 "stiffens" the plunger portion 108 when the plunger portion 108 enters the third cavity of the thermal base 52 and presses against the slanted-coil spring 128.

FIG. 9 shows a side view of the fluidic block 54 of FIG. 5 (from the opposite side of that shown in FIG. 8), including the lever 136 and plunger portion 108 of the retention mechanism 56. This view shows a general direction (arrow 160) of heat flow of heat through the fluidic block 54 caused by the thermal break (i.e., cutout region 68). The heat generally flows from the first region 70-1, which is heated by the heat source (i.e., the heater 60; FIG. 5), around the thermal break 68, to the second region 70-2, passing through the thin region 70-3. The thermal break 68 operates to guide and concentrate the flow of heat through this thin region 70-3. Within this thin region 70-3, the tubing 72 runs generally parallel to the horizontal direction of the thermal break 68 (i.e., perpendicular to the plane of FIG. 9), thereby maximizing an amount of tubing exposed to the concentrated flow of heat passing through the region and consequent heating of liquid within the tubing. The measurement of temperature (performed by the thermistor assembly 58; FIG. 5) occurs at the region 70-2 where the liquid leaves the fluidic block 54 and enters the column fitting 74.

FIG. 10 shows a bottom view of the fluidic block 54 of FIG. 5, including the bottom of the plunger portion 108 and opening into the cutout region 68 that produces a thermal break between regions 70-1 and 70-2 (the dashed lines show where the cutout region 68 ends within the fluidic block 54).

Figure 11:
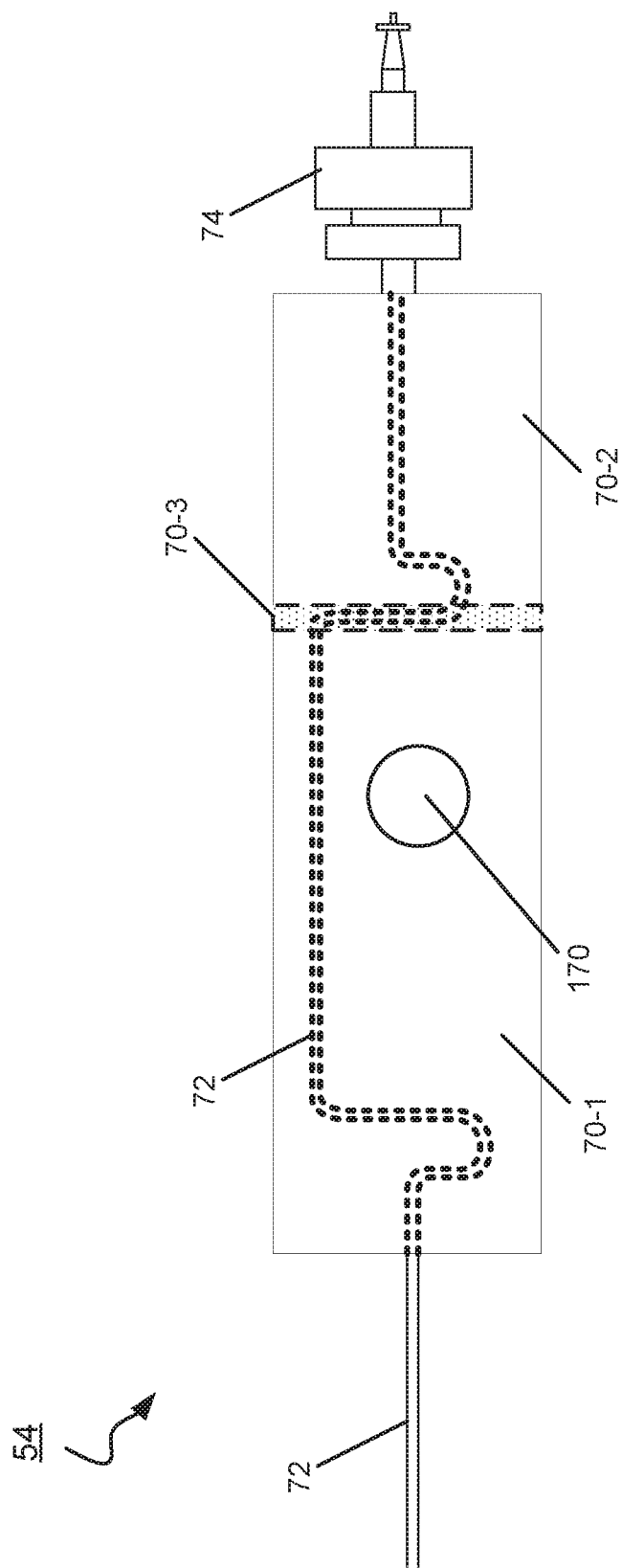
FIG. 11 is a plan view of the fluidic block of FIG. 5.

FIG. 11 shows a plan view of the fluidic block 54 of FIG. 5 with serpentine tubing 72 passing therethrough. The retention mechanism 56 (FIG. 5) is absent from the drawing to show an opening 170 into the fluidic block 54 through which the shaft 138 (FIG. 5) passes. The serpentine tubing 72 circumvents the opening 170 and runs above the thermal break 68 in the thin region 70-3 of the fluidic block. Other serpentine paths can be devised to ensure the liquid heats to the desired temperature.

Figure 12:
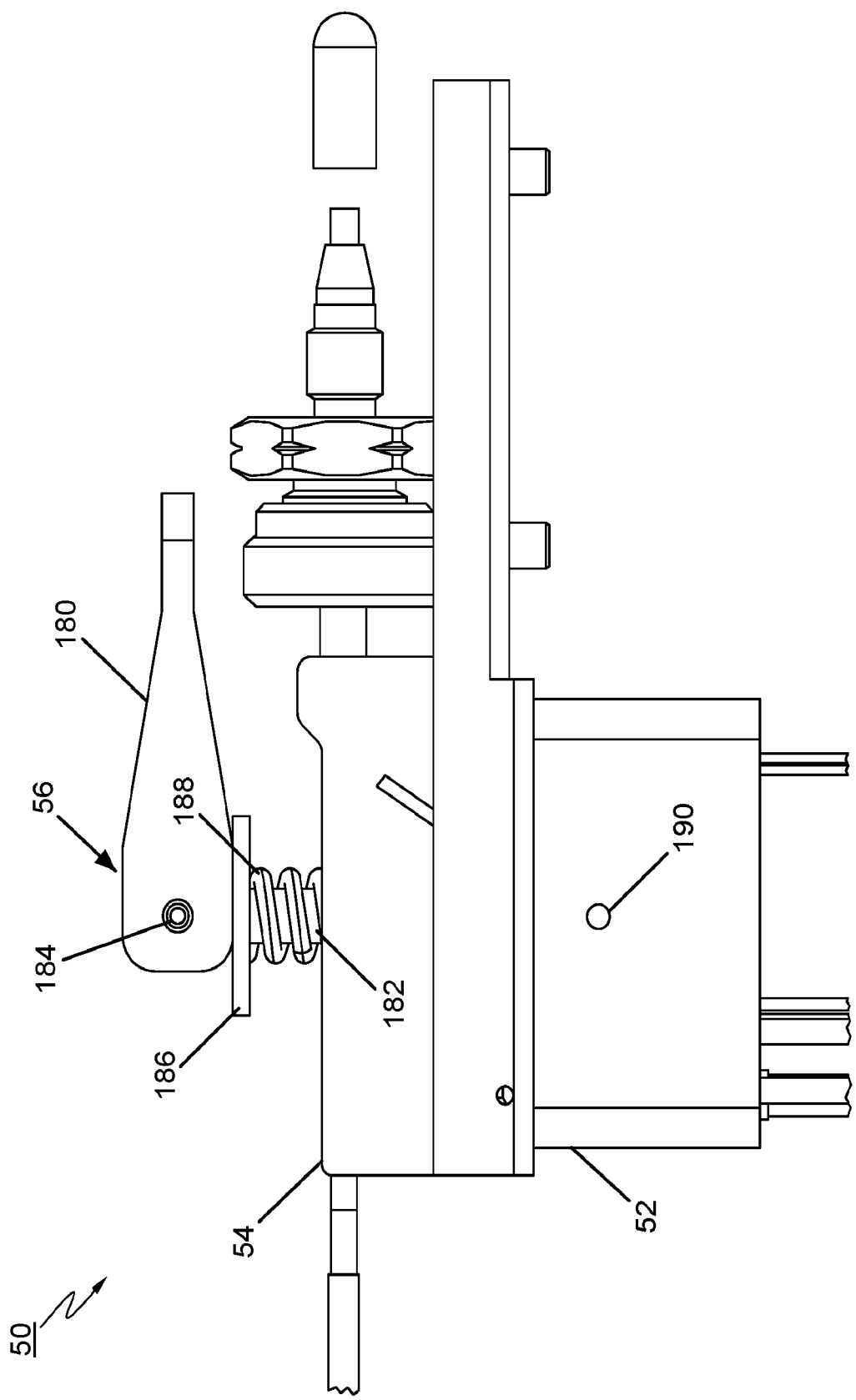
FIG. 12 is a side view of an embodiment of an active pre-heater assembly with another embodiment of a retention mechanism for joining the fluidic block to the thermal base.

FIG. 12 shows a side view of an active pre-heater assembly 50 with another embodiment of a retention mechanism 56 for joining the fluidic block 54 to the thermal base 52. The retention mechanism 56 includes a lever 180 coupled to a shaft 182 by a pin 184. The pin 184 coincides with an axis of rotation (perpendicular to the page of the figure). The lever 180 abuts a washer 186, which serves as a fulcrum. A spring 188 is disposed around the shaft 182 below the washer 186.

In FIG. 12, the retention mechanism 56 is in locked position, securing the fluidic block 54 to the thermal base 52, as described in more detail in connection with FIG. 13. A pin 190 passes entirely through the thermal base 52 (the ends of the pin 190 may be flush with the outer surfaces of the sides of the thermal base 52). When the retention mechanism 56 is in the locked position, one end of the shaft 188 (obscured by the thermal base 52) hooks this pin 190.

Figure 13:
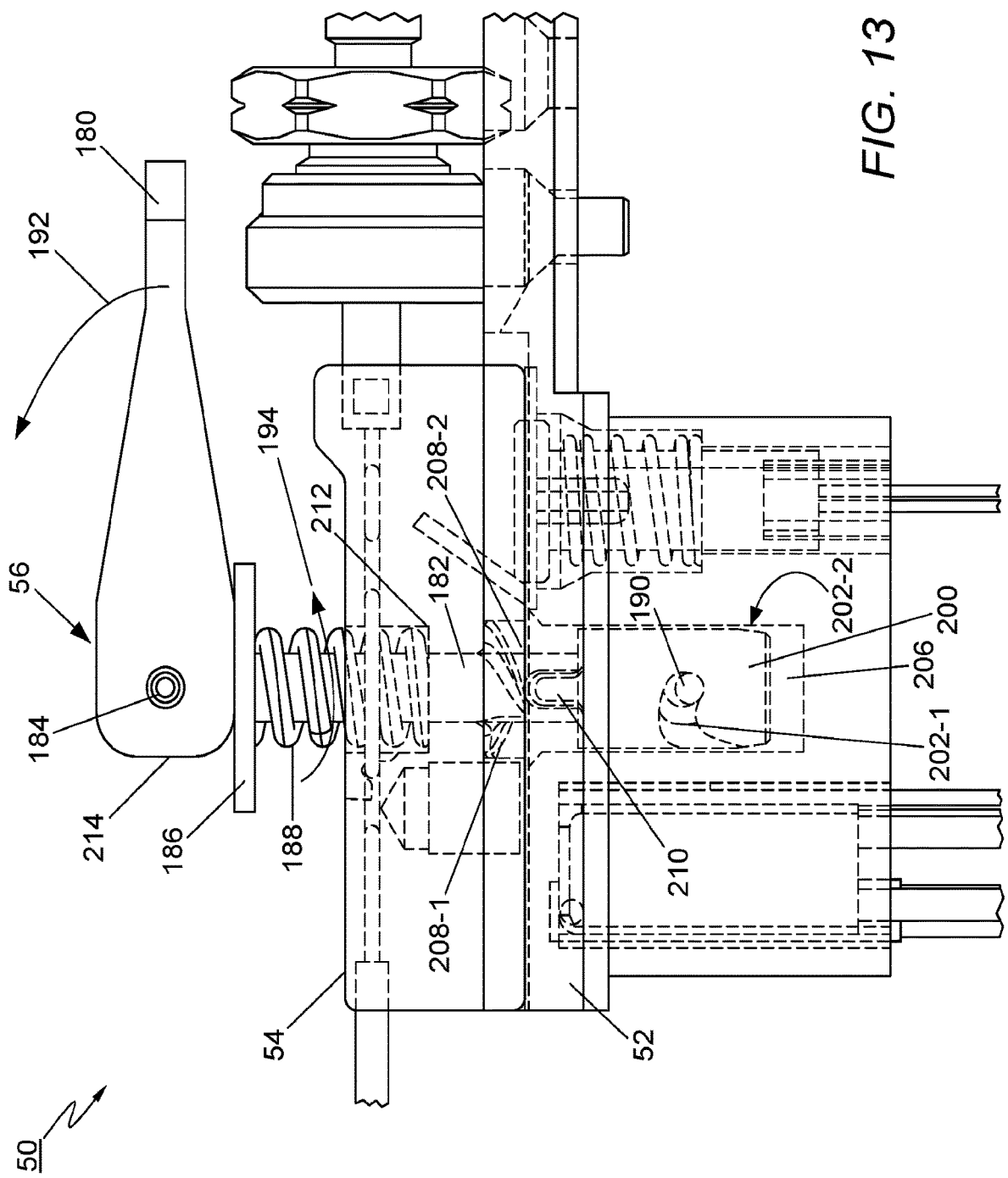
FIG. 13 is a transparent side view of the active pre-heater assembly of FIG. 12, showing the retention mechanism extending through the fluidic block into the thermal base.

FIG. 13 shows a transparent side view of the active pre-heater assembly 50 of FIG. 12, with the retention mechanism 56 extending through the fluidic block into the thermal base. The shaft 182 of the retention mechanism 56 widens to a plunger portion 200. The plunger portion 200 has a pair of helical grooves 202-1, 202-2 (generally, 202) that are rotationally symmetric on opposite sides of the plunger portion 200. In FIG. 13, the grooves 202 align at the closed end of each helical groove 202, where the pin 190 of the thermal base 52 rests when the retention mechanism 56 is locked. The pin 190 extends across a diameter of a cavity 206 formed in the thermal base 52 for closely receiving the plunger portion 200.

Formed in the bottom of fluidic block 52 are a pair of arcuate ramps 208-1, 208-2 (generally, 208). Each ramp 208 receives a round tipped prong 210 formed on the side of the plunger portion 200. The prongs 210 are on opposite sides of the plunger portion 200. Each prong 210 moves within its respective ramp 208 when the retention mechanism 56 turns.

In FIG. 13, the retention mechanism is in the locked position, wherein the spring 188 is compressed between the washer 186 and a cavity floor 212 within the fluidic block 52. With the spring 188 so compressed, each prong 210 is urged into a depression (FIG. 15) in a respective ramp 208, which holds the plunger portion 200 in place. In addition, because of the force produced by the spring 188, which urges the plunger portion 200 out of the cavity 206, the ends of the helical grooves 202 pull up on the pin 190 of the thermal base 52. This force thus urges the thermal base 52 against the fluidic block 54 for improved thermal contact.

Unless the retention mechanism 56 is in the locked position, the front cover of the column module 20 (FIG. 1) will not close; and when the front cover does not fully close, the pre-heater assemblies 50 will not operate. This safety mechanism ensures that the fluidic block 54 is correctly joined to the thermal base 52 before heating can occur.

To unlock the retention mechanism 56, an individual can lift the lever 180 in a direction illustrated by arrow 192, rotating the lever 180 about the pin 184. The lifting of the lever 180 operates to move the plunger portion 200 deeper into the cavity 206, moving the edge of the helical grooves 202 away from the pin 190. A flat surface of the lever 180 permits the individual to lift the lever 180 into a vertical position, at which position the lever 180 may be freely turned.

With the lever 180 in the vertical position, the individual then turns the lever 180 by 90 degrees (in this embodiment, counterclockwise, as illustrated by arrow 194). This quarter-turn operates to rotate the plunger portion 200, moving each prong 210 within its respective ramp 208 out of the depression, within which the prong 210 previously sat, into a lower region of the ramp 208. In addition, the rotation of the plunger portion 200 changes the location of the pin 190 within each helical groove 202; the pin 190 moves towards the open end of each helical groove 202. The movement of the pin 190 within the grooves 202 and the prongs 210 within the ramp 208 cooperate with the force of the compressed spring 188 that urges the plunger portion 200 out of the cavity 206. After the pin 190 exits the grooves 202, the plunger portion 200 is no longer secured to the thermal base 52, and the thermal base 52 can be pulled apart from the fluidic block 54.

Figure 14:
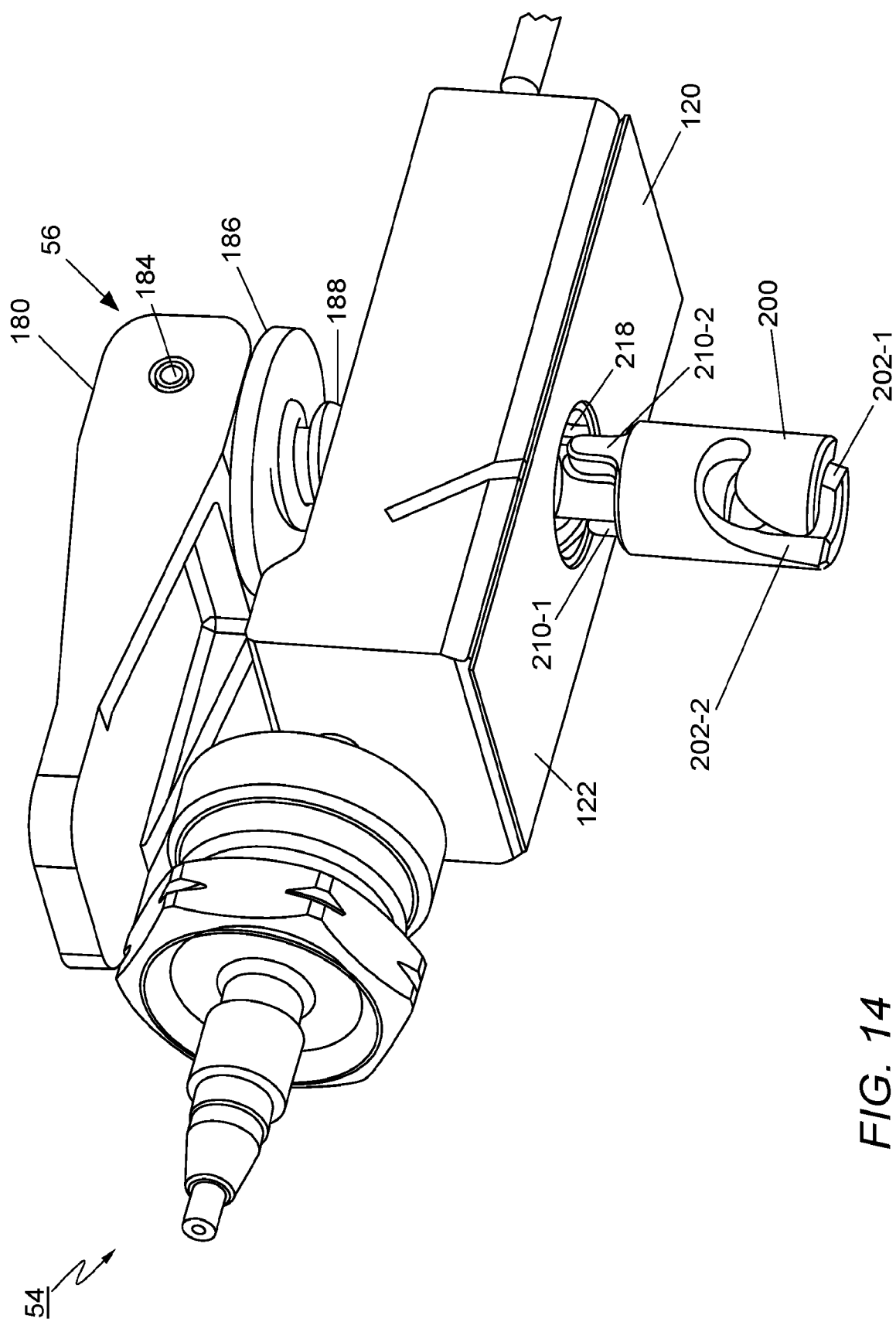
FIG. 14 is an elevated side view of the fluidic block with the retention mechanism of FIG. 12 extending therethrough.

FIG. 14 shows an elevated side view of the fluidic block 54 with the retention mechanism 56 of FIG. 12 extending therethrough. On this side of the fluidic block 54, the helical groove 202-2 and prong 210-2 of the plunger portion 200 are in the foreground, whereas the other helical groove 202-1 and prong 210-1 are in the background. In addition, this view shows the extent to which the plunger portion 200 extends beyond the bottom of the fluidic block 54 when the retention mechanism 56 is in the locked position. When the retention mechanism 56 is raised vertically and turned by 90 degrees, the prongs 210 of the plunger portion 200 are drawn along the inclined ramps 208 (FIG. 13) into the bore 218 of the fluidic block 54 by force of the spring 188.

Figure 15:
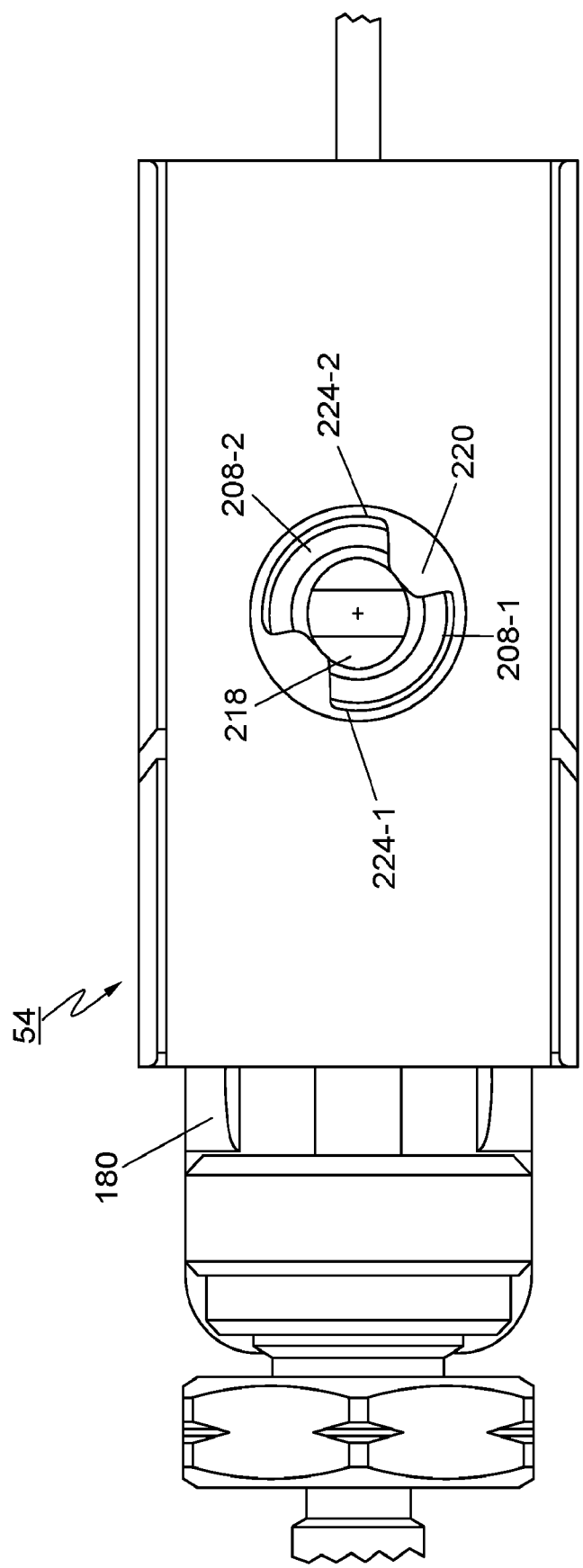
FIG. 15 is a bottom view of the fluidic block having arcuate ramps cast in the fluidic block.

FIG. 15 shows a bottom view of the fluidic block 54 having a circular region 220 surrounding the bore 218 of the fluidic block 54. On opposite sides of the circular region 220 are the arcuate ramps 208-1 and 208-2. Each ramp 208-1, 208-2 has a depressed notch 224-1, 224-2, respectively (referred to previously as a depression). The notches 224-1, 224-2 (generally, 224) are directly opposite each other across the opening into the bore 218. Each depressed notch 224 receives the tip of a prong 210 of the plunger portion 200 when the retention mechanism 56 is in the locked position. Operating as seats for the prongs 210, these notches 224 provide a tactile sense that the fluidic block 54 and thermal base 52 have been properly secured to each other. With the prongs 210 so seated, the notches 224 provide a degree of resistance to incidental turning of the lever 180 when the retention mechanism 56 is locked (the helical shape of each groove 202 in the plunger portion 200 contributing to this resistance). In addition, each notch 224 abuts one raised end of the ramp 208 to limit the extent of the turning of the lever 180. On the other side of each notch 224, the ramp 208 gradually declines (into the plane of the figure).

While the invention has been shown and described with reference to specific preferred embodiments, it should be understood by those skilled in the art that various changes in form and detail may be made therein without departing from the spirit and scope of the invention as defined by the following claims. For example, the aforementioned embodiments describe two-piece active pre-heaters, whereas embodiments of one-piece active pre-heaters, wherein the fluidic block is inseparable from the thermal base, can also benefit from the temperature measurement accuracy achieved by thermally isolating the thermistor assembly from the thermal base and from the use of thermal breaks to guide heat flow in the fluidic block.

What is claimed is:

1. A heater assembly for use in chromatography, comprising:
    a thermally conductive base having a first side, a second side opposite the first side, a chamber extending fully through the base with an opening at the first side of the base and at the second side of the base, and a cavity with an opening at the second side of the base;
    a heater disposed within the cavity in thermal communication with the base; and
    a thermistor assembly disposed within the chamber, the thermistor assembly having a thermistor within a thermally conductive body, the body having a head region with a planar surface, the thermistor assembly being disposed within the chamber such that the planar surface of the head region is exposed at the opening of the chamber at the first side of the base for making thermally conductive contact therewith, the chamber being wider than the head region of the body such that the thermistor assembly is thermally isolated from the base.

2. The heater assembly of claim 1, wherein the body further comprises a neck region adjacent the head region; and the thermistor assembly further comprises a spring disposed around the neck region of the body between the head region and a surface within the chamber to produce a force that urges the planar surface of the head region out of the opening of the chamber at the first side of the base.

3. The heater assembly of claim 1, wherein the base has a hole disposed between the cavity and the chamber, the hole being adapted to receive a plunger of a retention mechanism.

4. The heater assembly of claim 3, wherein the hole has a circumferential pocket and further comprising a spring disposed in the pocket.

5. The heater assembly of claim 4, wherein the spring disposed in the pocket is a slanted-coil spring.

6. The heater assembly of claim 3, wherein the hole extends fully through the base with an opening at the first side of the base and an opening on the second side of the base; and further comprising a plug disposed in the opening on the second side of the base to seal the base from liquid draining through the hole.

7. The heater assembly of claim 1, wherein the base has a second cavity adjacent the cavity with the heater, and further comprising a safety switch disposed in the second cavity in thermal communication with the base for measuring temperature and disabling the heater should the measured temperature exceed a threshold.

8. The heater assembly of claim 1, further comprising one or more alignment rails on the first side of the base for receiving corresponding alignment features of a fluidic block when joining the heater assembly to the fluidic block.

9. The heater assembly of claim 1, further comprising a mounting plate extending from one end of the first side of the base by which the heater assembly is secured to a column trough.

10. A chromatography column pre-heating apparatus comprising:
   a thermally conductive fluidic block with a thermally conductive tube for conveying liquid, the tube extending from a first region of the fluidic block to a second region of the fluidic block; and
   a heater assembly coupled to the fluidic block, the heater assembly comprising:
      a thermally conductive base having a cavity and a chamber, the cavity being disposed near the first region of the fluidic block and the chamber being disposed near the second region of the fluidic block;
      a heater disposed within the cavity in thermal communication with the base, the heater producing heat that propagates into the fluidic block; and
      a thermistor assembly disposed within the chamber of the base, the thermistor assembly having a temperature-sensing element isolated thermally from the base, the thermistor assembly having a surface in thermal communication with the second region of the fluidic block to conduct heat from the second region of the fluidic block to the temperature-sensing element, the temperature-sensing element measuring temperature of the second region of the fluidic block uninfluenced by a temperature of the base because of the thermal isolation of the temperature-sensing element from the base.

11. The chromatography column pre-heating apparatus of claim 10, wherein the thermistor assembly includes a spring adapted to urge the surface of the thermistor assembly against the fluidic block.

12. The chromatography column pre-heating apparatus of claim 10, further comprising a retention mechanism to couple the fluidic block to the base.

13. The chromatography column pre-heating apparatus of claim 12, wherein the fluidic block has a hole extending from a first side of the fluidic block through to an opposite, second side of the fluidic block, the retention mechanism includes:
   a lever mechanism movably abutting the first side of the fluidic block;
   a shaft coupled to the lever mechanism, the shaft extending through the hole in the fluidic block; and
   a plunger portion coupled to the shaft and extending from the second side of the fluidic block, and
the lever mechanism has a first position that extends the plunger portion from the hole and a second position that retracts the plunger portion towards the hole.

14. The chromatography column pre-heating apparatus of claim 13, wherein the base has a hole with a circumferentially disposed spring for receiving the plunger portion.

15. The chromatography column pre-heating apparatus of claim 14, wherein the spring is a slanted-coil spring.

16. The chromatography column pre-heating apparatus of claim 13, wherein:
   the base has a second cavity for receiving the plunger portion and a pin extending across the second cavity;
   the retention mechanism has a spring disposed around the shaft to urge the plunger portion into the second cavity of the base; and
   the plunger portion of the retention mechanism has one or more grooves that receive the pin when the plunger portion turns within the second cavity in response to a 90-degree turn of the lever mechanism.

17. The chromatography column pre-heating apparatus of claim 16, wherein:
   the plunger portion of the retention mechanism has one or more prongs; and
   the fluidic block has an external surface that faces the thermal base when the fluidic block is coupled to the thermal base, the external surface of the fluidic block having one or more ramps around the hole of the fluidic block, each ramp having a notch for receiving one of the one or more prongs of the plunger portion when the retention mechanism is turned to the first position.

18. The chromatography column pre-heating apparatus of claim 10, further comprising a thermal gasket disposed between the first region of the fluidic block and the base and between the surface of the thermistor assembly and the second region of the fluidic block.

19. The chromatography column pre-heating apparatus of claim 10, wherein the base has a second cavity near the cavity with the heater, and further comprising a safety switch disposed in the second cavity in thermal communication with the base for measuring temperature and disabling the heater should the temperature measured by the safety switch exceed a threshold.

20. The chromatography column pre-heating apparatus of claim 10, wherein the fluidic block is detachable from the base.

21. A chromatography column module comprising:
   a chromatography column; and
   a pre-heating apparatus coupled to the chromatography column, the pre-heating apparatus comprising:
      a thermally conductive fluidic block with a thermally conductive tube for conveying liquid, the tube being coupled at one end to the chromatography column, the tube extending from a first region of the fluidic block to a second region of the fluidic block near the end of the tube coupled to the chromatography column; and a heater assembly coupled to the fluidic block, the heater assembly comprising:
- a thermally conductive base having a cavity and a chamber, the cavity being disposed opposite the first region of the fluidic block and the chamber being disposed opposite the second region of the fluidic block;
- a heater disposed within the cavity in thermal communication with the base, the heater producing heat that propagates into the fluidic block; and
- a thermistor assembly disposed within the chamber of the base, the thermistor assembly having a temperature-sensing element isolated thermally from the base, the thermistor assembly having a surface in thermal communication with the second region of the fluidic block to conduct heat from the second region of the fluidic block to the temperature-sensing element, the temperature-sensing element measuring temperature of the second region of the fluidic block uninfluenced by a temperature of the base because of the thermal isolation of the temperature-sensing element from the base.

22. The chromatography column module of claim 21, wherein the thermistor assembly of the heater assembly includes a spring adapted to urge the surface of the thermistor assembly against the fluidic block.

* * * * *